Feb. 2, 1971   A. J. KURTZIG   3,560,944
FARADAY ROTATION DEVICE
Filed Aug. 14, 1969   2 Sheets-Sheet 1
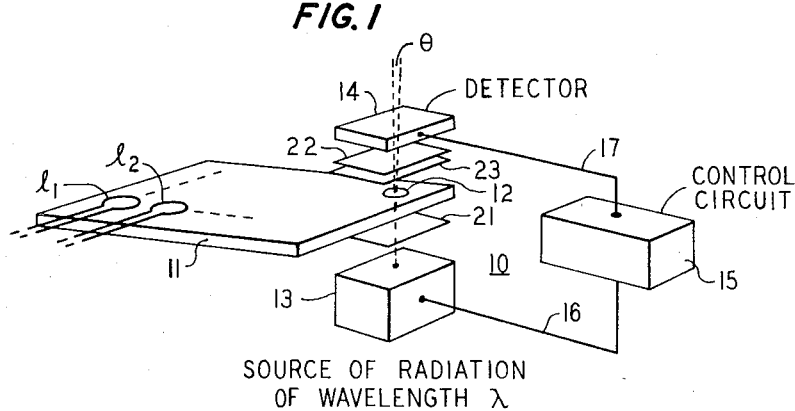
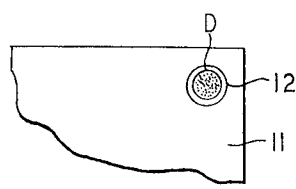
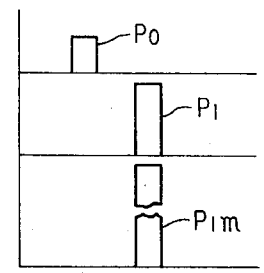
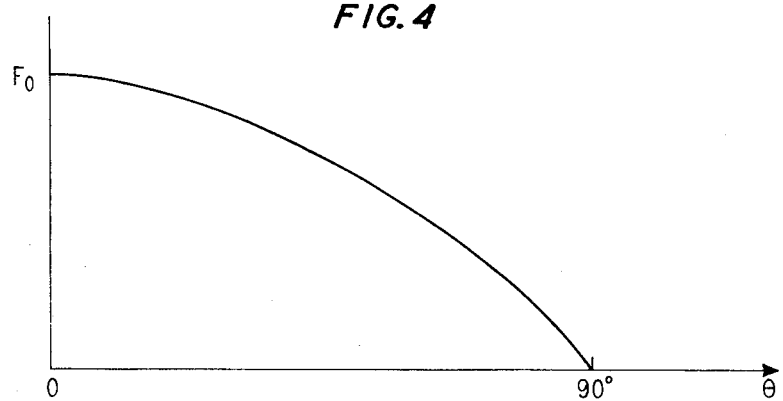
INVENTOR
*A.J. KURTZIG*
BY
*ATTORNEY*

United States Patent Office 3,560,944
Patented Feb. 2, 1971

3,560,944
FARADAY ROTATION DEVICE
Arjeh J. Kurtzig, Short Hills, N.J., assignor to Bell Telephone Laboratories, Incorporated, Murray Hill, N.J., a corporation of New York
Filed Aug. 14, 1969, Ser. No. 850,066
Int. Cl. G02f 1/22, 1/24; G11c 11/14
U.S. Cl. 340—174     9 Claims

ABSTRACT OF THE DISCLOSURE

Useful Faraday rotation in magnetic birefringent crystals is shown to be increased if incident radiation propagates in the plane defined by the magnetization and the optic axis of the crystal in a direction nonparallel to the magnetization.

FIELD OF THE INVENTION

This invention relates to optical detection arrangements and more particularly to such arrangements where the Faraday effect is employed.

BACKGROUND OF THE INVENTION

The term "Faraday effect" designates the ability of some crystalline materials to rotate the polarization vector of linearly polarized light. In magnetic materials which exhibit this effect, "negatively" magnetized material causes rotation of the polarization vector in a first direction, say clockwise, while "positively" magnetized material causes rotation counterclockwise. An analyzer is set to extinguish light rotated in the first direction.

In most materials which exhibit the Faraday effect, the angle through which the polarization vector is rotated is directly proportional to the length of the optical path through the crystal. As might be expected, losses due, for example, to absorption are also proportional to the length of that path. Consequently, a tradeoff exists in the determination of a crystal thickness for optimum Faraday rotation.

In some magnetic materials there are some complicating factors. Some such materials as, for example, rare earth orthoferrites exhibit birefringence as well as Faraday rotation. The effect of birefringence on Faraday rotation is a periodic function of crystal thickness and may at some thicknesses result in a complete cancellation of Faraday rotation. Therefore, the thicknesses of such crystals must be chosen carefully; advantages are realized also if a number of crystals are stacked as disclosed in copending application Ser. No. 827,389, filed May 23, 1969, for W. J. Tabor.

Nor can this complication be eliminated easily. All crystalline materials except cubic materials exhibit optical properties which vary with direction. These (noncubic) materials are called anisotropic. In "uniaxial" anisotropic materials there is a single axis of symmetry called the optic axis along which no birefringence is exhibited. Unfortunately, the magnetization in these materials is perpendicular to the optic axis and no Faraday rotation is exhibited along the optic axis either.

In some materials, on the other hand, birefringence can be eliminated. In some orthoferrites, for example, the magnetization is not perpendicular to an optic axis and an orientation can be found for which birefringence can be eliminated without eliminating Faraday rotation. The orthoferrites are biaxial (orthorhombic) materials having two optic axes. An orthoferrite crystal is formed typically so that the c axis, which is the preferred direction of magnetization, is normal to the plane of the crystal. In such crystals the direction of magnetization and the two optic axes often define a single plane. Normally, light is propagated (in this plane and) along the direction of magnetization in order to maximize intrinsic Faraday rotation. The term "intrinsic Faraday rotation" refers to rotation in the absence of birefringence. The orthoferrites are an important class of materials because they are representative of a greater class of members in which single wall domains can be moved.

A single wall domain is a reverse-magnetized domain bounded in the plane of the crystal in which it is moved by a single domain wall which closes on itself. Domains of this type are free to move in the plane of the crystal. The Bell System Technical Journal (BSTJ), vol. XLVI, No. 8, October 1967, at pp. 1901 et. seq., describes the propagation of single wall domains in some detail. Magnetization in such a domain is normal to the crystal, in a first direction which we may take as positive. The remainder of the crystal has its magnetization in a negative (opposite) direction.

Magnetic domains in orthoferrites are detected by directing polarized light through the crystal along the preferred direction of magnetization in a position in the crystal into which domains are moved. An analyzer is set to extinguish background light, passing light to a detector only if a domain is present in the output position. It is contemplated that an optical arrangement in accordance with this invention will have a principal use as a detector of domains in a domain propagation arrangement. Consequently, the invention will be described in this context.

BRIEF DESCRIPTION OF THE INVENTION

It has been found that if polarized light is incident to a noncubic magnetic crystal, which exhibits both the Faraday effect and birefringence, in a direction nonparallel to the direction of magnetization and in the plane of the magnetization and the optic axis, an increase in useful Faraday rotation is realized. In an illustrative embodiment, a source of polarized light is oriented to provide incident radiation at an "off-axis" angle of about 60 degrees with respect to the magnetization direction in a crystal of samarium-terbium orthoferrite in which single wall domains are moved.

BRIEF DESCRIPTION OF THE DRAWING

FIG. 1 is a schematic illustration of an off-axis Faraday rotation arrangement in accordance with this invention;

FIG. 2 is a schematic illustration of a portion of FIG. 1;

FIG. 3 is a pulse diagram of the outputs of the arrangement of FIG. 1; and

FIGS. 4–7 are graphs of physical properties of the magnetic material of the arrangement of FIG. 1.

DETAILED DESCRIPTION

Figure 5:
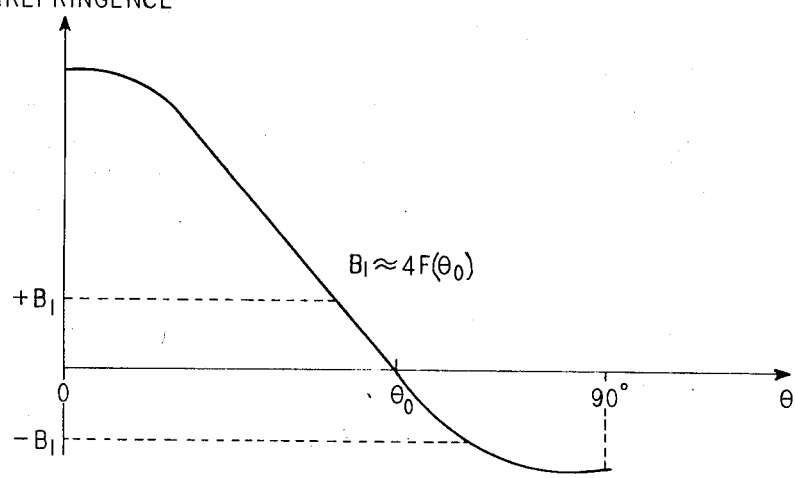

FIG. 1 shows a memory arrangement 10 adapted for optical readout in accordance with this invention. The arrangement comprises a magnetic sheet 11 which is conveniently a rare earth orthoferrite crystal. Single wall domains are provided and moved controllably in such sheets as disclosed in the above-mentioned BSTJ article.

We are concerned primarily with the optical readout of magnetic domains in sheet 11. Accordingly, the means for providing domains initially and for moving those domains in the magnetic sheet are not shown fully. These means are well known as shown in the above-mentioned BSTJ article. It may be assumed that such means are present and enable the presence and absence of domains to be provided controllably at an output position 12 in FIG. 1. Loops $l_1$ and $l_2$ in the figure represent the means for so moving the domains.

Faraday rotation is employed to detect the presence and absence of domains in the output position. To this end, a source 13 capable of providing radiation of wavelength λ, conveniently a laser, is positioned to direct radiation at output position 12. A detector 14 is positioned to detect radiation which passes sheet 11 at position 12. Source 13 and detector 14 are connected to a control circuit 15 via conductors 16 and 17, respectively.

In FIG. 1, the output position is represented by a closed line (12). As shown in that figure, no domain is present within the area enclosed by that line. FIG. 2, on the other hand, shows the output position occupied by a domain D represented by a stippled circle so designated. Light from source 13 in FIG. 1 provides a relatively low output pulse Po in detector 14 when a domain is absent and a relatively high output P1 when a domain is present in output position 12 as indicated in FIG. 3.

As explained in detail in the aforementioned application of W. J. Tabor, if sheet 11 is of a suitable thickness, the amplitude of pulse P1 may be made large as indicated by the pulse P1$m$ in FIG. 3. If care is not exercised in the selection of sheet thickness, light passing through the output position when a domain is present may be extinguished and pulse P1 will be undetectable.

In accordance with the present invention, the amplitude of pulse P1$m$ is increased by directing light nonparallel to the magnetization direction in sheet 11 but in the plane defined by that magnetization direction and the optic axis.

An understanding of the invention is facilitated by a consideration of the changes in the pertinent physical properties of anisotropic crystals as a function of direction in the crystal. We will consider the cases of both biaxial and uniaxial crystals.

Figure 6:
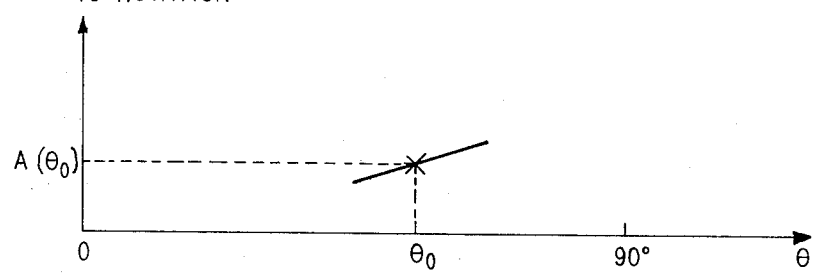

Consider a thin biaxial crystal having axes $a$, $b$, and $c$ where axes $a$ and $b$ lie in the plane of the crystal and $c$ is normal to the crystal. We will take the familiar case where the magnetization lies along the $c$ axis. The index of refraction for light polarized along each of the axes is represented by the symbol N with a subscript designating the axis. For the four cases of Table I, the properties in biaxial materials vary as shown in the graphs of FIGS. 4, 5, and 6.

TABLE I

| | |
|---|---|
| Case one | $N_c < N_b < N_a$ |
| Case two | $N_c > N_b > N_a$ |
| Case three | $N_c < N_a < N_b$ |
| Case four | $N_c > N_a > N_b$ |

FIG. 4 is a plot of Faraday rotation with respect to the angle $\theta$ between the direction of light propagation and the direction of magnetization ($\theta = 0$). The rotation drops off from the intrinsic Faraday rotation $F_0$ when $\theta$ is zero to the absence of rotation when $\theta$ is 90 degrees.

FIG. 5 is a plot of birefringence effect against the same angle $\theta$. The birefringence can be seen to decay to zero at a critical angle $\theta_0$, which can be shown to be equal to $$\sin^{-1}\sqrt{\frac{N_b^2 - N_a^2}{N_c^2 - N_b^2}}$$

for cases one and two of Table I and $$\sin^{-1}\sqrt{\frac{N_a^2 - N_b^2}{N_c^2 - N_b^2}}$$

for cases three and four of Table I, then increasing in magnitude.

In accordance with this invention, the maximum useful Faraday rotation is achieved when polarized light propagates in a direction which makes an angle of $\theta_0$ with the magnetization. At about that angle, there is sufficient gain with respect to birefringence effects to more than offset the diminished Faraday rotation. This angle corresponds to the direction of the optic axis in a crystal of samarium-terbium orthoferrite (or any suitable orthorhombic, monoclinic or triclinic crystal).

The above-mentioned copending application of Tabor describes the maximum allowable birefringence effect to be 180 degree retardation before the effect detracts from the Faraday rotation. Broken horizontal lines $\pm B_1$ (where $B_1 \approx 4F(\theta_0)$) shown in FIG. 5 correspond to 180 degree retardation. The intersections between these lines and the curve in FIG. 5 indicate the limits to the preferred range of angles of propagation directions about $\theta_0$.

FIG. 6 is a plot of absorption for the thickness which produces an arbitrary 45 degree rotation versus $\theta$. The absorption equals $$\frac{45}{F_0 \sin \theta_0} A$$

in db (when $\theta = \theta_0$) where A is an absorption constant (in db/cm.). The desired amount of rotation can be achieved with a single crystal when the propagation direction is at an angle of about $\theta_0$ in a range dictated by the intersection between lines at $\pm B_1$ and the curve in FIG. 5, as indicated by the inclined line in FIG. 6; rotation of 45 degrees can be realized, in a single crystal, only at an angle in this range. For relatively low absorption, however, the selected angle should be less than $\theta_0$ as indicated by the left extreme of the inclined line as viewed in FIG. 6.

Figure 7:
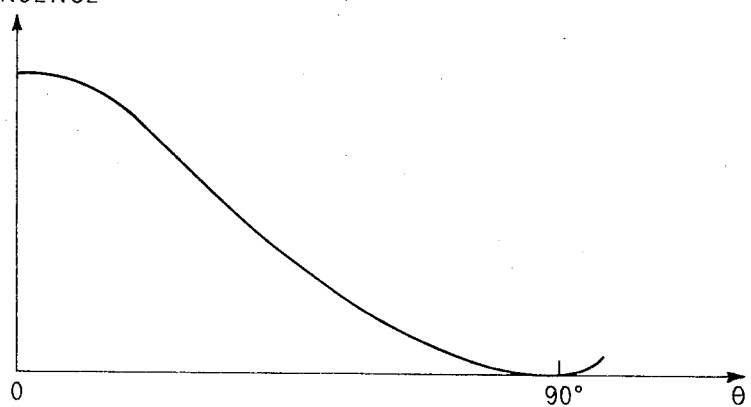

For biaxial crystals where $N_a < N_c < N_b$ or $N_a > N_c > N_b$, the birefringence decays as shown in FIG. 7 and has a minimum when $\theta = 90°$. This is the case also with uniaxial crystals in which the optic axis is normal to the (easy) plane of magnetization. At $\theta = 90°$, the propagation direction is along the optic axis and no Faraday rotation is realized. As $\theta$ decreases from 90 degrees, Faraday rotation increases; birefringence increases at a much slower rate. The maximum allowable birefringence effect is 180 degree retardation as has been stated above. Theta ($\theta$) is chosen to be less than 90 degrees to effect such retardation. From $$\frac{B}{F} \approx 4$$

(see FIG. 5), the corresponding Faraday rotation is 45 degrees. For a representative crystal of iron borate (FeBO$_3$), about 500 mils thick, $\theta = 89°$ (for light of about 5,250 A.). If a stacked arrangement of (3 mil thick) crystals of FeBO$_3$ is used as disclosed in Tabor supra, $\theta_0 = 81°$. For the detection of single wall domains, rotation of about one degree would be satisfactory; materials about a mil thick would be suitable in this context.

Of course, absorption varies with $\theta$, and second order absorption effects indicate minimum absorption (for 45 degree rotation) at smaller $\theta$. The directions of the light at angles which vary slightly about $\theta_0$ are useful accordingly.

What has been described is considered only illustrative of the principles of this invention. Accordingly, various arrangements in accordance with those principles can be devised by those skilled in the art without departing from the spirit and scope of this invention. For example, stacked crystals as disclosed in the above-mentioned copending application of W. J. Tabor can be improved by off-axis propagation in accordance with this invention. Also, passive optical isolators are achieved with, for example, a single piece of orthoferrite cut at a thickness and oriented such that propagation along $\theta_0$ produces 45 degrees of rotation. The analyzer and polarizer in an isolator arrangement are oriented at 45 degrees to one another as is well understood in the art.

What is claimed is:

1. An arrangement comprising a magnetic birefringent crystal transparent to radiation of a wavelength λ, said crystal having an optic axis and a preferred direction of magnetization defining a plane therein, and means for directing at said crystal polarized light having a wavelength λ and a propagation direction, said means being oriented with respect to said crystal such that said propagation direction is in said plane and at an angle $\theta$ to said preferred direction of magnetization.

2. An arrangement in accordance with claim 1 wheren said crystal has $a$, $b$, and $c$ crystallographic axes, the indices of refraction $N_a$, $N_b$, and $N_c$ along those axes being such that said angle $$\theta_0 = \sin^{-1}\sqrt{\frac{N_a^2 - N_b^2}{N_c^2 - N_b^2}}$$

3. An arrangement in accordance with claim 1 having $a$, $b$, and $c$ crystallographic axes, the indices of refraction $N_a$, $N_b$, and $N_c$ along those axes being such that said angle $$\theta_0 = \sin^{-1}\sqrt{\frac{N_b^2 - N_a^2}{N_c^2 - N_b^2}}$$

4. An arrangement in accordance with claim 1 including means for moving single wall domains in said crystal selectively into the path of said radiation.

5. An arrangement in accordance with claim 1 wherein said crystal is orthorhombic and said propagation direction is along an optic axis thereof.

6. An arrangement in accordance with claim 1 wherein said crystal has $a$, $b$, and $c$ crystallographic axes and a first thickness, the indices of refraction $N_a$, $N_b$, and $N_c$ along those axes being such that $N_a < N_b < N_c$ and wherein said propagation direction is at about an angle to said optic axis at which birefringence effects about 180 degree retardation of light at that angle.

7. An arrangement in accordance with claim 1 wherein said crystals has $a$, $b$, and $c$ crystallographic axes and a first thickness, the indices of refraction $N_a$, $N_b$, and $N_c$ along those axes being such that $N_a > N_b > N_c$ and wherein said propagation direction is at about an angle to said optic axis at which birefringence effects about 180 degree retardation of light at that angle.

8. An arrangement in accordance with claim 1 wherein said crystal is uniaxial and has a first thickness and wherein said propagation direction is at about an angle to said optic axis at which birefringence effects about 180 degree retardation of light at that angle.

9. An arrangement in accordance with claim 2 wherein said crystal has a thickness T and $\theta_0$ is chosen such as to rotate polarized light 45 degrees.

References Cited

UNITED STATES PATENTS 3,420,601   1/1969   Young et al.

JAMES W. MOFFITT, Primary Examiner

U.S. Cl. X.R.

350—151, 157, 161